Sept. 30, 1958 — F. M. VAN WINKLE — 2,853,794
AUTOMOBILE FRONT END ALIGNMENT DEVICE
Filed Oct. 2, 1956 — 2 Sheets-Sheet 1

Ferman M. Van Winkle
INVENTOR.

Sept. 30, 1958   F. M. VAN WINKLE   2,853,794
AUTOMOBILE FRONT END ALIGNMENT DEVICE
Filed Oct. 2, 1956   2 Sheets-Sheet 2
Fig. 6
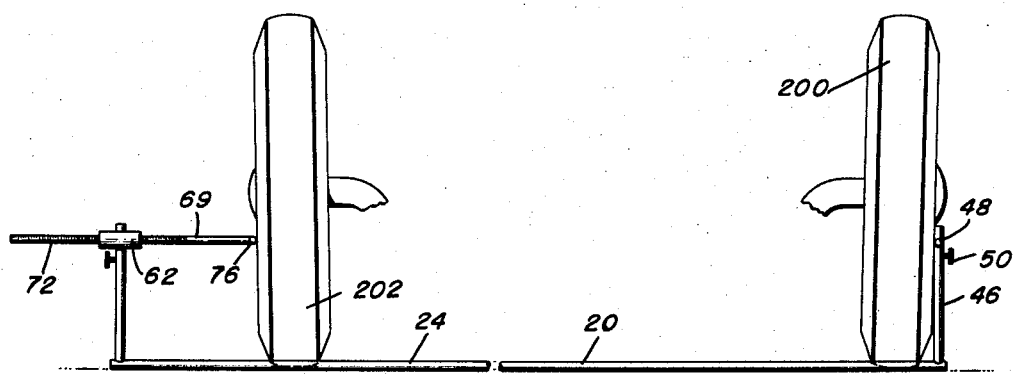
Fig. 7
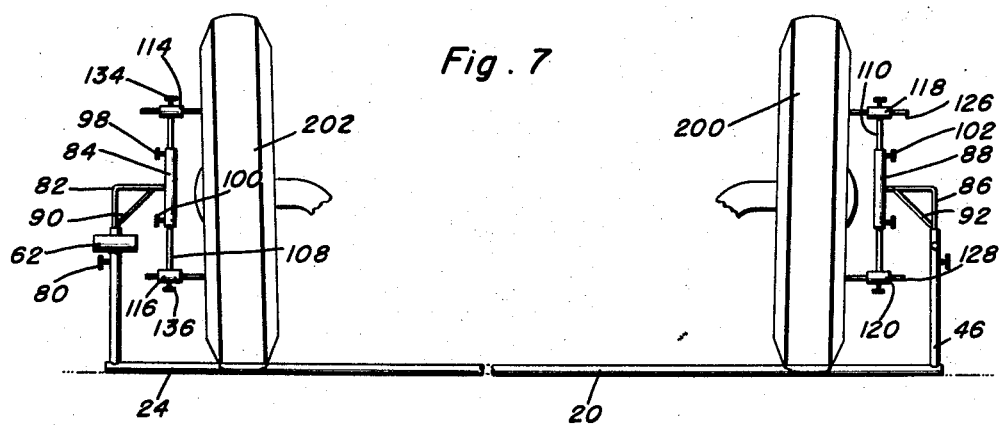
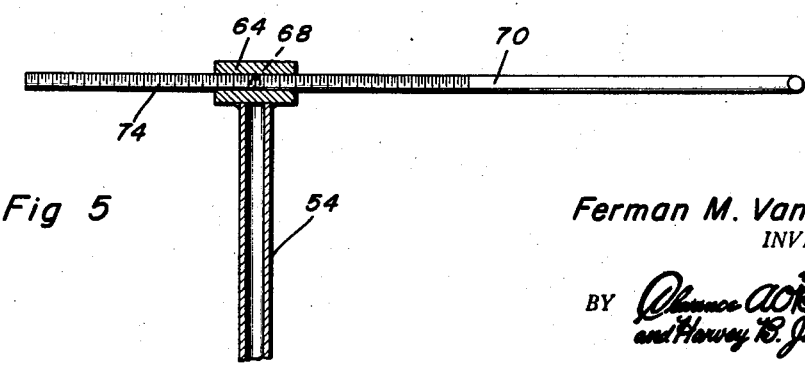
Fig 5
Ferman M. Van Winkle
INVENTOR.

United States Patent Office 2,853,794
Patented Sept. 30, 1958

2,853,794
AUTOMOBILE FRONT END ALIGNMENT DEVICE

Ferman M. Van Winkle, Coodys Bluff, Okla.

Application October 2, 1956, Serial No. 613,456

6 Claims. (Cl. 33—203.17)

This invention relates to a device for use in the alignment of the wheels and front end suspension of an automotive vehicle, such as passenger automobiles, trucks, buses or the like and more particularly to a comparatively lightweight and inexpensive mechanism for use in the wheel alignment of passenger vehicles predominantly.

The primary object of the present invention resides in the provision of a wheel alignment device that is simple in construction and inexpensive to manufacture so as to be readily available to even rural garages and establishments which generally cannot afford the conventional and relatively expensive wheel alignment devices.

The construction of this invention features an arrangement of parts including a tubular frame carrying standards rising therefrom which in turn carries the wheel engaging members and alignment indicating rods.

Still further objects and features of the invention reside in the provision of an automobile front end alignment device that is strong and durable, easy to assemble and utilize, and efficient in operation.

These, together with the various ancillary objects and features of the invention which will become apparent as the following description proceeds, are attained by this wheel alignment device, a preferred embodiment of which has been illustrated in the accompanying drawings, by way of example only, wherein:

Figure 5 is a sectional view on an enlarged scale as taken along the plane of line 5—5 in Figure 1 illustrating the toe-in alignment tool arrangement;

Figure 6 is an elevational view of the invention shown in position for checking toe-in;

Figure 7 is an elevational view of the invention shown in use in checking the camber.

Figure 1:
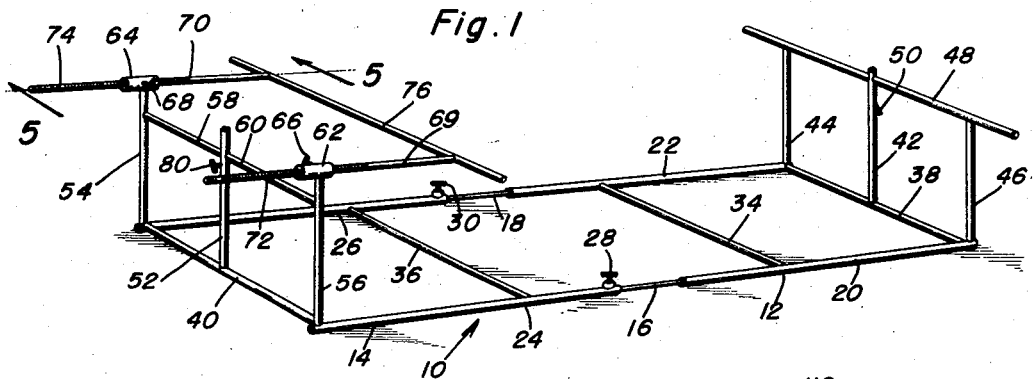
Figure 1 is a perspective view of the invention shown in position for use in determining the proper toe-in of the wheels.
Figure 2:
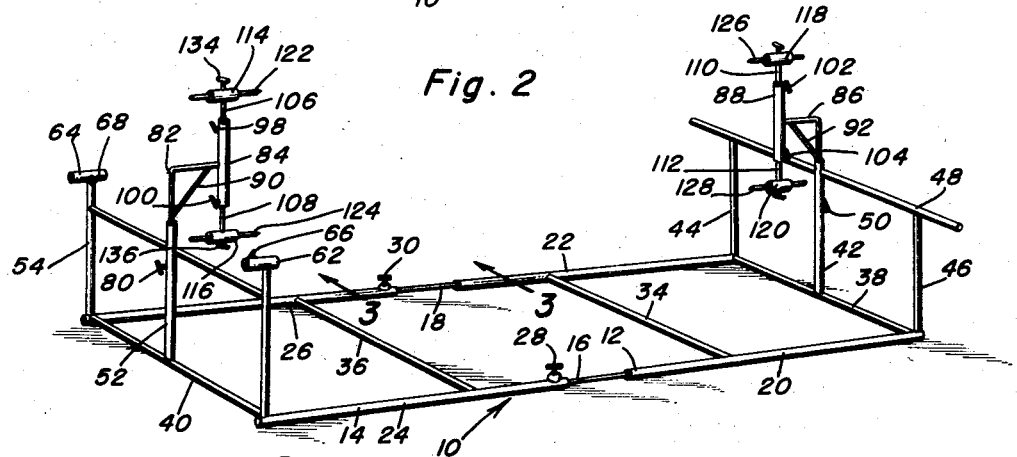
Figure 2 is a perspective view of the invention shown arranged for use in checking the camber of each wheel.
Figure 3:
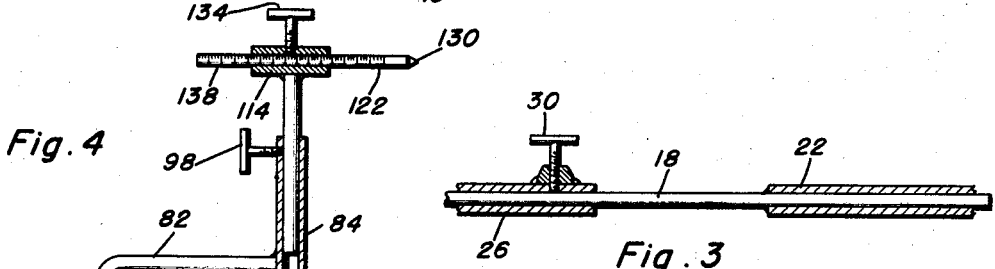
Figure 3 is a sectional detail view in an enlarged scale as taken along the plane of line 3—3 of Figure 2 illustrating the means for adjusting the telescoping base frame.

With continuing reference to the accompanying drawings wherein like reference numerals designate similar parts throughout the various views, and with initial attention to Figures 1, 3 and 5, reference numeral 10 generally designates the automobile front end alignment device comprising the present invention. This front end alignment device includes a pair of substantially U-shaped tubular frame members 12 and 14 which together with telescoping rods 16 and 18 form the base frame of the invention. The U-shaped members 12 and 14 include tubular members 20, 22 and 24, 26. The rods 16 and 18 are welded or otherwise secured, as can be best seen in Figure 3, to the tubular members 20 and 22. The rods 16 and 18 are adapted to telescopically extend into the tubular members 24 and 26 and locking screws 28 and 30 are provided for lockingly securing the rods 16 and 18 in an adjusted position. The rods 16 and 18 may be provided with suitable indicia thereon, if desired, for indicating the relative position of the rod so as to assure that the frame is aligned. Interconnecting the tubular members 20, 22 and 24, 26 respectively are transverse intermediate braces 34 and 36. Other transverse members 38 and 40 are provided adjacent the remote ends of the tubular members or legs 20, 22 and 24, 26.

Secured to and rising from the transverse member 38 is a first vertically extending side frame member which includes a centrally disposed tubular standard 42 as well as outer standards 44 and 46 which carry a horizontally extending bar 48 of any suitable shape and which may be formed in sections if desired. A thumb operated clamp screw 50 is provided for the tubular standard 42. The horizontally extending bar 48 is adapted to be positioned, as shown in Figure 6, flush against one wheel of a vehicle for checking toe-in.

Rising from the transverse member 40 is a second vertically extending side frame member which includes a centrally disposed tubular standard 52 and outer standards 54 and 56. Brace bars 58 and 60 interconnect the outer standards 54 and 56 with the centrally disposed standard 52. The outer standards 54 and 56 carry tubular horizontal sleeves 62 and 64 which are provided with thumb screws as at 66 and 68. A pair of measuring rods 69 and 70 are slidably disposed within the sleeves 62 and 64 and adapted to be locked in place by means of the thumb screws 66 and 68. The rods 69 and 70 besides being provided with the indicia which are indicated generally at 72 and 74 so that the position thereof may be adequately determined, carry a toe-in checking bar 76 adapted to be pushed until it is flush against another wheel of the vehicle.

Received in the tubular standard 52 which is provided with a thumb locking screw 80 is a substantially L-shaped member 82 carrying a sleeve 84. Likewise, an L-shaped fitting 86 carrying a tube 88 is provided. Reinforcing braces 90 and 92 are provided for the fittings 82 and 86.

Figure 4:
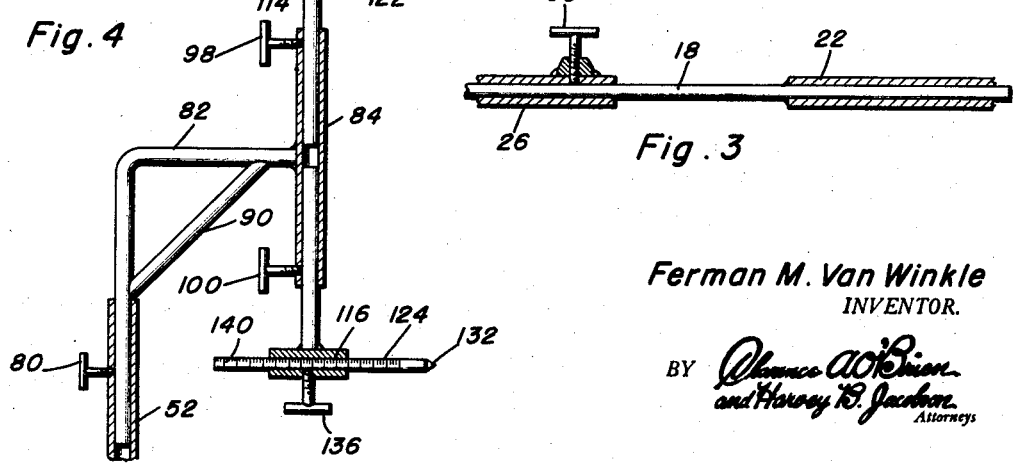
Figure 4 is an enlarged sectional detail view of the camber tool comprising one of the important elements of the invention.

The sleeve 84 is provided with a pair of thumb screws 98 and 100 and the sleeve 88 is provided with thumb screws 102 and 104. Four T-shaped fittings 106, 108, 110 and 112 are adjustably lockingly secured in the sleeves 84 and 88 and these T-shaped fittings which include rods receivable in the sleeves 84 and 88 and tubes 114, 116, 118 and 120 receive measuring rods 122, 124, 126 and 128. As can be seen best in Figure 4, the measuring rods, such as the measuring rods 122 and 124 are provided with pointed ends as at 130 and 132 and are held in place by thumb screws as at 134, 136. Suitable indicia 138 and 140 are provided on the measuring rods 122 and 124 and 126, 128.

In use, for checking toe-in, the bar 48 is positioned flush against the wheel 200 as shown in Figure 6. Then, the measuring rods 69 and 70 are adjusted until the bar 78 is in a position flush against the wheel 202.

The wheel 202 may be then adjusted until the readings on the wheel alignment device 10 on the measuring rods 69 and 70 are the desired measurements. Then, reversing the device 10, the toe-in of the wheel 200 can be adjusted. In Figure 7 there is shown the device in use for measuring an adjusting camber. It is noted that the measuring rods 122, 124, 126 and 128 are positioned against the wheels 200 and 202. By adjusting the wheels until the measurements are those desired, the wheels can be readily adjusted for camber.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel alignment device comprising a telescopic base frame, a first vertically extending side frame member secured to said base frame at one end thereof, said first side frame member including a fixed horizontally extending bar and including a first centrally disposed tubular standard, a second vertically extending side frame member secured to said base frame at the opposite end thereof from said first side frame member, said second side frame member including a second centrally disposed tubular standard, a pair of fittings having vertically extending tubes telescopingly received in said first and second tubular standards, a pair of T-shaped members having stems telescopingly received in said T-shaped members including horizontally extending tubular sleeves, measuring rods having indicia thereon in said sleeves, and means adjustably securing said rods in said sleeves.

2. A wheel alignment device comprising a telescopic base frame, a first vertically extending side frame member secured to said base frame at one end thereof, said first side frame member including a fixed horizontally extending bar and including a first centrally disposed tubular standards, a second vertically extending side frame member secured to said base frame at the opposite end thereof from said first side frame member, said second side frame member including a pair of vertically extending outer standards carrying a pair of horizontal sleeves, and measuring rods adjustably secured in said horizontal sleeves on said outer standards.

3. A wheel alignment device comprising a telescopic base frame, a first vertically extending side frame member secured to said base frame at one end thereof, said first side frame member including a fixed horizontally extending bar and including a first centrally disposed tubular standard, a second vertically extending side frame member secured to said base frame at the opposite end thereof from said first side frame member, said second side frame member including a second centrally disposed tubular standard, a pair of fittings having vertically extending tubes telescopingly received in said first and second tubular standards, a pair of T-shaped members having stems telescopingly received in said T-shaped members including horizontally extending tubular sleeves, measuring rods having indicia thereon in said sleeves, and means adjustably securing said rods in said sleeves, said second side frame member including a pair of vertically extending outer standards carrying a pair of horizontal sleeves, and measuring rods adjustably secured in said horizontal sleeves on said outer standards.

4. A wheel alignment device comprising a telescopic base frame, a first vertically extending side frame member secured to said base frame at one end thereof, said first side frame member including a fixed horizontally extending bar and including a first centrally disposed tubular standard, a second vertically extending side frame member secured to said base frame at the opposite end thereof from said first side frame member, said second side frame member including a second centrally disposed tubular standard, a pair of fittings having vertically extending tubes telescopingly received in said first and second tubular standards, a pair of T-shaped members having stems telescopingly received in said T-shaped members including horizontally extending tubular sleeves, measuring rods having indicia thereon in said sleeves, and means adjustably securing said rods in said sleeves, said base frame including a pair of U-shaped members including spaced tubular legs, and telescoping rods fixed to one of said U-shaped members telescopingly received in the legs of the other of said U-shaped members.

5. A wheel alignment device comprising a telescopic base frame, a first vertically extending side frame members secured to said base frame at one end thereof, said first side frame member including a fixed horizontally extending bar and including a first centrally disposed tubular standards, a second vertically extending side frame member secured to said base frame at the opposite end thereof from said first side frame member, said second side frame member including a pair of vertically extending outer standards carrying a pair of horizontal sleeves, and measuring rods adjustably secured in said horizontal sleeves on said outer standards, said base frame including a pair of U-shaped members including spaced tubular legs, and telescoping rods fixed to one of said U-shaped members telescopingly received in the legs of the other of said U-shaped members.

6. A wheel alignment device comprising a telescopic base frame, a first vertically extending side frame member secured to said base frame at one end thereof, said first side frame member including a fixed horizontally extending bar and including a first centrally disposed tubular standard, a second vertically extending side frame member secured to said base frame at the opposite end thereof from said first side frame member, said second side frame member including a second centrally disposed tubular standard, a pair of fittings having vertically extending tubes telescopingly received in said first and second tubular standards, a pair of T-shaped members having stems telescopingly received in said T-shaped members including horizontally extending tubular sleeves, measuring rods having indicia thereon in said sleeves, and means adjustably securing said rods in said sleeves, said second side frame member including a pair of vertically extending outer standards carrying a pair of horizontal sleeves, and measuring rods adjustably secured in said horizontal sleeves on said outer standards, said base frame including a pair of U-shaped members including spaced tubular legs, and telescoping rods fixed to one of said U-shaped members telescopingly received in the legs of the other of said U-shaped members.

References Cited in the file of this patent

UNITED STATES PATENTS

| | | |
|---|---|---|
| 1,544,980 | Hartsock | July 7, 1925 |
| 2,029,067 | Graham et al. | Jan. 28, 1936 |
| 2,108,383 | Morse | Feb. 15, 1938 |
| 2,160,226 | Phillips | May 30, 1939 |
| 2,532,749 | Aurand et al. | Dec. 5, 1950 |
| 2,624,950 | Mitchel | Jan. 13, 1953 |
| 2,633,643 | Thompson | Apr. 7, 1953 |

FOREIGN PATENTS

| | | |
|---|---|---|
| 738,405 | France | Oct. 17, 1932 |